(12) United States Patent
Bieber et al.

(10) Patent No.: US 9,927,024 B2
(45) Date of Patent: Mar. 27, 2018

(54) METHOD FOR DETERMINING A REFERENCE VALUE OF AN ACTUATING CURRENT

(71) Applicant: ZF Friedrichshafen AG, Friedrichshafen (DE)

(72) Inventors: Sven Bieber, Bermatingen (DE); Jan-Frederik Kuhn, Friedrichshafen (DE); Marcus Hiemer, Meckenbeuren (DE); Stephan Schinacher, Egesheim (DE); Mario Brugger, Tettnang (DE); Markus Lukassek, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 217 days.

(21) Appl. No.: 14/934,266

(22) Filed: Nov. 6, 2015

(65) Prior Publication Data

US 2016/0131684 A1 May 12, 2016

(30) Foreign Application Priority Data

Nov. 11, 2014 (DE) .......................... 10 2014 222 948

(51) Int. Cl.
*F16H 61/00* (2006.01)
*F16H 61/06* (2006.01)
*F16H 59/46* (2006.01)
*F16H 61/66* (2006.01)

(52) U.S. Cl.
CPC ...... *F16H 61/061* (2013.01); *F16H 2059/465* (2013.01); *F16H 2061/062* (2013.01); *F16H 2061/6609* (2013.01); *F16H 2702/06* (2013.01)

(58) Field of Classification Search
CPC ..................... F16H 2061/062; F16H 2061/064
See application file for complete search history.

(56) References Cited

U.S. PATENT DOCUMENTS

| 2008/0293544 A1* | 11/2008 | Schiele ............... F16H 61/0021 |
| | | 477/164 |
| 2009/0111651 A1* | 4/2009 | Gale ....................... F16H 59/72 |
| | | 477/98 |
| 2015/0133252 A1* | 5/2015 | Mihatsch .............. F16H 61/061 |
| | | 475/86 |

FOREIGN PATENT DOCUMENTS

DE 101 51 537 A1 5/2003

* cited by examiner

*Primary Examiner* — Tisha Lewis
(74) *Attorney, Agent, or Firm* — Davis & Bujold PLLC; Michael J. Bujold (57) ABSTRACT

A method is described for determining a reference value of an actuating current that corresponds to a defined operating point of an electro-hydraulically actuated frictional shifting element of a continuously variable power-branched transmission, at which the shifting element transmission capacity is zero, and starting from which an increase of actuating force immediately increases the transmission capacity. The actuating current reference value of the shifting element, when closed with a further shifting element decoupled from the transmission output and when a transmission input rotational speed is higher than a defined threshold, is reduced until a rotational speed difference between the rotational speeds of the shifting element halves exceeds a predefined limit value such that, at the time when the limit value is exceeded, the reference value of the actuating current is the reference value of the actuating current that corresponds to the defined operating point of the shifting element.

12 Claims, 4 Drawing Sheets

METHOD FOR DETERMINING A REFERENCE VALUE OF AN ACTUATING CURRENT

This application claims priority from German patent application serial no. 10 2014 222 948.0 filed Nov. 11, 2014.

FIELD OF THE INVENTION

The invention concerns a method for determining a reference value of an actuating current that corresponds to a defined operating point of an electro-hydraulically actuated frictional shifting element of a continuously variable power-branched transmission.

BACKGROUND OF THE INVENTION

In continuously variable power-branched transmissions or building machine transmissions known from practice, hydraulically actuated frictional shifting elements are commonly used, which in the area of a piston chamber are filled with hydraulic fluid and acted upon by appropriate actuation pressure. The extent of filling of a piston chamber of such a shifting element significantly influences the transmission capacity of the shifting element and the torque that can be transmitted by the shifting element concerned at the time. In addition the actuation sequence of a shifting element, starting from an open operating condition of the shifting element, in which the shifting element can transmit essentially no torque and its transmission capacity is essentially zero, in the direction toward an operating condition in which torque can be transmitted by the shifting element operating in a slipping or slip-free mode, affects the closing behavior of the shifting element and therefore also the shifting comfort, which in turn is decisively determined by the torque applied in the area of a drive output of a vehicle or the variation thereof.

Since, as is known, manufacturing tolerances of mass-produced components used in shifting elements and hydraulic lines can sometimes show an undesirable degree of scatter, for each shifting element an individual calibration should be carried out in order to know the particular filling behavior of the shifting elements and to be able to actuate the shifting element so as to achieve an appropriate level of shifting comfort. The parameters that characterize the clutch filling in each case and which are determined by the calibration are stored in the area of a non-volatile memory of a transmission control system and taken into account when carrying out the actuation of a shifting element during every gearshift.

In this context, two parameters in particular are characteristic for the filling behavior of a shifting element. The first parameter is the so-termed rapid filling time, during which a shifting element is acted upon by a so-termed rapid filling pulse in order to fill the shifting element within short operating times. For this, the piston chamber of a shifting element is acted upon by a defined rapid filling pressure during the rapid filling time. The rapid filling phase is followed by a so-termed filling equalization phase, during which the actuation pressure applied in the area of the piston chamber falls from the level of the rapid filling pressure to a level of a filling equalization pressure that represents the second parameter, and remains there for a defined filling equalization time. At the end of the filling equalization phase, ideally the shifting element is in a defined operating condition in which the transmission capacity of the shifting element is essentially equal to zero, and starting from which, an increase of the actuation force of the shifting element results in an immediate increase of the transmission capacity of the shifting element.

From DE 100 51 537 A1 a method for the automated determination of the rapid filling time and the filling equalization pressure of shifting elements is known, whose filling and engagement process can be divided into a rapid filling phase and a filling equalization phase. The rapid filling time and the filling equalization pressure are determined by indirect measurement in a single run.

Disadvantageously, the known method is only partially suitable for changing a shifting element during operation to the defined operating condition in which the transmission capacity of the shifting element is essentially equal to zero and starting from which an increase of an actuating force results in an immediate increases of the transmission capacity. This follows from the fact that the electro-hydraulic regulation train usually provided for actuating a shifting element shows considerable tolerance variations in the area of the electrical components or the current specification, and accordingly a reference value specification for an actuating current of a shifting element, required for adjusting the filling equalization pressure determined, will most probably not correspond to the current value actually required for adjusting the filling equalization pressure determined.

In contrast to transmissions for passenger cars, which are made with hydrodynamic torque converters and respectively associated converter bridging clutches and which, when the converter bridging clutch is open, enable a correspondingly gentle or delayed response of a drive-train built in that way to variations of the torque transmitted in the drive-train, in vehicle drive-trains with continuously variable power-branched transmissions, which are designed correspondingly inflexibly, abrupt torque changes necessarily result in shifting jerks and for that reason an inaccurate actuation of a frictional shifting element that is actuated electro-hydraulically necessarily has an undesirably pronounced adverse effect on the shifting and driving comfort of a building machine.

SUMMARY OF THE INVENTION

Accordingly, the purpose of the present invention is to provide a method for determining a reference value of an actuating current that corresponds to a defined operating point of an electro-hydraulically actuated frictional shifting element of a continuously variable power-branched transmission, in order to be able to operate a vehicle built with a continuously variable power-branched transmission with a desired high level of shifting and driving comfort.

According to the invention, this objective is achieved by a method having the characteristics as described below.

In the method according to the invention for determining a reference value of an actuating current that corresponds to a defined operating point of an electro-hydraulically actuated frictional shifting element of a continuously variable power-branched transmission, at which operating point the transmission capacity of the shifting element is essentially zero and starting from which an increases of an actuating force of the shifting element results in an immediate increase of the transmission capacity, wherein one shifting element half is connected to a transmission input and the further shifting element half of the shifting element can be coupled to a transmission output, the reference value of the actuating current of the shifting element in its essentially closed operating condition when the further shifting element half is decoupled from the transmission output and when the rotational speed of the transmission input is higher than a defined threshold value, is reduced until a rotational speed difference between the rotational speeds of the shifting element halves exceeds a predefined limit value, such that at the time-point when the limit value is exceeded the reference value of the actuating current is the reference value of the actuating current that corresponds to the defined operating point of the shifting element.

By virtue of the procedure according to the invention, the complete actuation chain of a frictional shifting element of a continuously variable power-branched transmission which comprises both electric as well as hydraulic and mechanical control elements, is taken into account when determining the reference value of the actuating current of the shifting element that corresponds to the defined operating point of the shifting element. This means that the reference value of the actuating current that corresponds to the filling equalization pressure of the shifting element is determined exactly as a function of the current output of a control unit until the shifting element has been filled, and is used during the actuation of the shifting element. A shifting element can be actuated to an extent required for a high level of shifting comfort, with little effort, by determining the actuating current-actuating pressure relationship precisely.

The method according to the invention can preferably be used with vehicle drive-trains having continuously variable power-branched transmissions, but it is also possible to use the method according to the invention with vehicle drive-trains having transmissions with shifting clutches, such as transmissions with a hydrodynamic torque converter, preferably with a closed converter bridging clutch. In that case the transmission also comprises a frictional shifting element.

In a simply implemented variant of the method according to the invention, in the area of a valve device, a reference value of a hydraulic actuating pressure of the shifting element is set as a function of the reference value of the actuating current, which pressure can be applied in the area of a piston chamber of the shifting element.

From an open operating condition in which its piston chamber is essentially completely drained, if by controlling the reference value of the actuating current and as a result applying a pressure pulse in the area of the piston chamber with a defined pressure level of the actuating pressure and for a defined operating time, the shifting element is changed to a closed operating condition, then the method according to the invention can be carried out within short and reproducible operating times.

In a variant of the method according to the invention, the operating time required until the reference value of the actuating current that corresponds to the defined operating point has been determined, can be made shorter by reducing the reference value of the actuating current, preferably in a ramp-like manner, already before the closed operating condition of the shifting element at which the difference between the rotational speed of its shifting element halves is essentially equal to zero has been reached, from the level of the pressure pulse to a level at which the shifting element is still in its closed condition and from which the reference value of the actuating current is reduced along a ramp until the rotational speed difference between the speeds of the shifting element halves exceeds the limit value that was defined earlier.

From the point in time at which the rotational speed difference between the speeds of the shifting element halves exceeds the previously defined limit value, if the reference value of the actuating current is set for a predefined time period to a level at which the rotational speed difference between the speeds of the shifting element halves is larger than an additional limit value, which is in turn larger that the previously defined limit value, then with little effort it is ensured that the shifting element has changed to its completely open operating condition.

In a further advantageous variant of the method according to the invention, after the lapse of a predefined time interval the reference value of the actuating current is increased again along a ramp until the rotational speed difference between the rotational speeds of the shifting element halves falls below a further predefined limit value, such that at the time-point when this occurs the reference value of the actuating current is also a reference value of the actuating current that corresponds to the defined operating point of the shifting element.

Thus, for the two branches of the hysteresis curve of a relationship between the actuating current and the actuating pressure of an electro-hydraulically actuated frictional shifting element, an offset value between the real behavior of the actuation chain of such a shifting element and so-termed i-p-characteristic curves determined empirically on a test-bench can be determined. These values can be taken into account directly in the control system. Alternatively, it is also possible to displace an already determined relationship between the actuating current and the actuating pressure of a shifting element to an appropriate extent as a function of the values determined by the calibration according to the invention.

In a further advantageous variant of the method according to the invention, after determining the reference value of the actuating current that corresponds to the defined operating point of the shifting element, the reference value of the actuating current is reduced to a level at which the shifting element changes to its fully open operating condition.

In a variant of the method according to the invention which is particularly simple to carry out, the rotational speeds of the shifting element halves are determined by measurement.

If the limit values are determined empirically, the method according to the invention can be carried out with little computational effort.

In a further variant of the method according to the invention that can also be carried out with little computational effort, the shifting element is actuated in accordance with a relationship between reference values of the actuating current, reference values of the actuating pressure and a characteristic diagram that shows the operating temperature of the transmission.

If the shifting element is actuated in accordance with a characteristic curve that shows a relationship between reference values of the actuating current and reference values of the actuating pressure, which have been determined empirically, then the shifting element can again be actuated with little effort.

In a further variant of the method according to the invention, the characteristic curves or characteristic diagram are adapted with little effort as a function of a deviation between the reference value of the actuating current that corresponds to the defined operating point of the shifting element and the reference value of the actuating current obtainable from the characteristic diagram or curves for the defined operating point of the shifting element, whereby the shifting element can be actuated to an extent which, for example, is modified in relation to conditions that vary over the operating life of a transmission.

The above-described method can be carried out in an automated manner both at the end of a production line of a transmission and also later in the vehicle, wherein the calibration in the vehicle can be carried out automatically after the lapse of defined operating times and/or if necessary it can be activated and carried out manually by a service technician. Regardless of this, the current calibration status can be communicated by way of a vehicle-internal CAN bus.

The characteristics emerging from the example embodiment of the object of the invention described below are in each case suitable, whether considered in isolation or in any combination with one another, as further developments of the object of the invention.

BRIEF DESCRIPTION OF THE DRAWINGS

Further advantages and advantageous further developments of the invention emerge from the example embodiments whose principle is described with reference to the drawing, which shows.

DETAILED DESCRIPTION OF THE PREFERRED EMBODIMENTS

Figure 1:
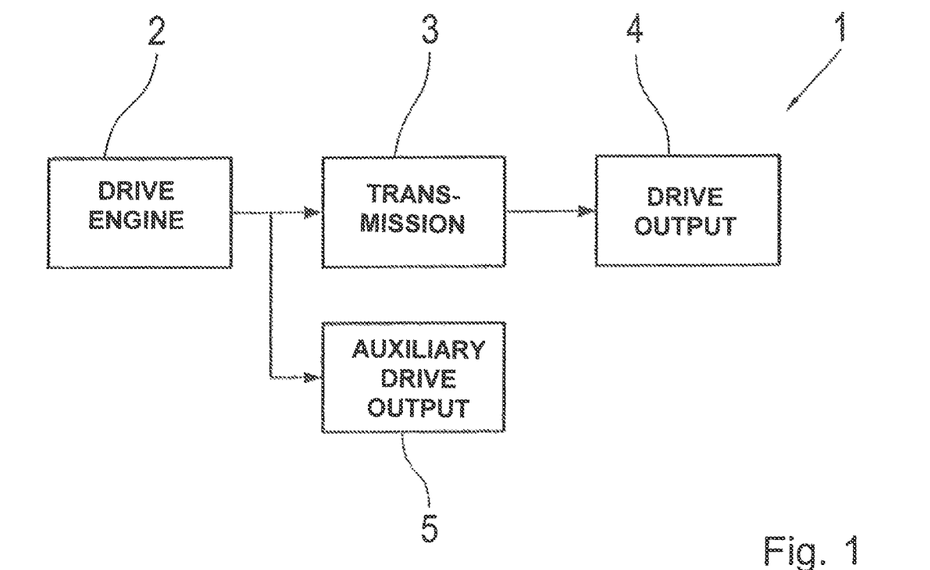
FIG. 1: A very schematic block diagram of a vehicle drive-train having a continuously variable power-branched transmission.

FIG. 1 shows a schematic representation of a vehicle drive-train with a drive engine 2 and with a continuously variable power-branched transmission 3 that can be coupled thereto. The drive engine 2 is in this case in the form of an internal combustion engine, preferably a diesel engine, and in other embodiments of the vehicle drive-train 1 could also be an electric machine or a combination of an internal combustion engine of any type and an electric machine.

On the transmission output side, the transmission 3 is functionally connected to a drive output 4, whereby a drive torque provided by the drive engine 2, correspondingly converted as a function of the gear ratio set in the area of the transmission 3, is transmitted as a corresponding traction force in the area of the drive output 4. In the area between the drive engine 2 and the transmission 3 an auxiliary power takeoff 5 or a working hydraulic system can be acted upon by torque from the drive engine 2.

Figure 2:
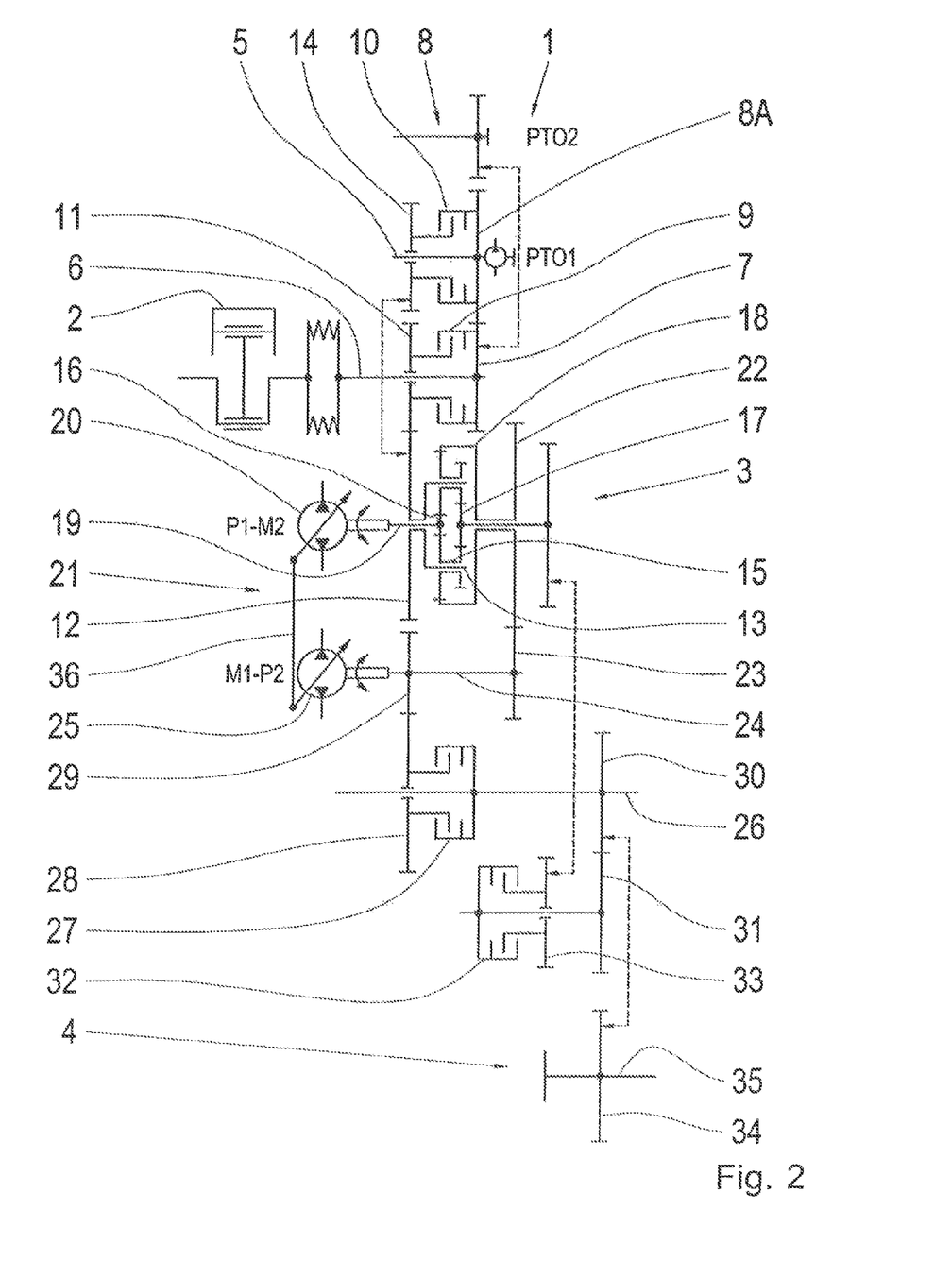
FIG. 2: A gearwheel layout of a continuously variable power-branched transmission.

FIG. 2 shows a gearwheel layout of a possible embodiment of the transmission 3 according to FIG. 1, which is connected in a rotationally fixed manner to the drive engine 2 in the area of a transmission input shaft or transmission input 6. By way of a fixed wheel 7 and a fixed wheel 8A the transmission input shaft 6 drives the auxiliary power takeoff 5, a further auxiliary power takeoff 8 and the first shifting element halves of frictional shifting elements 9, 10. The frictional shifting element 9 is arranged coaxially with the transmission input shaft 6; whereas the frictional shifting element 10 or the driving direction clutch for reversing is positioned on the shaft of the auxiliary power takeoff 5 arranged coaxially with the transmission input shaft 6. In the closed operating condition of the frictional shifting element 9 or driving direction clutch for forward driving the transmission input shaft 6 drives, by way of a loose wheel 11 mounted to rotate on the transmission input shaft 6, a loose wheel 12 which is coupled in a rotationally fixed manner to a planetary carrier 13. In the closed operating condition of the frictional shifting element 10, the transmission input shaft 6 drives the loose wheel 12 by way of a loose wheel 14.

On the planetary carrier 13 are mounted to rotate a number of double planetary gearwheels 15. The double planetary gearwheels 15 mesh with a first sun gear 16 and a second sun gear 17 as well as with a ring gear 18. The first sun gear 16 is connected in a rotationally fixed manner to a shaft 19 of a first hydraulic unit 20 of a hydrostat unit 21. The ring gear 18 is functionally connected by way of a fixed wheel 22 and a fixed wheel 23 to a shaft 24 of a second hydraulic unit 25 of the hydrostat unit 21.

In the area of the continuously variable power-branched transmission 3, several gear ratio ranges can be set, within which in turn the gear ratio of the transmission 3 can be varied continuously by adjusting the hydrostat unit 21. Regardless of the representation in FIG. 2, the transmission 3 can be designed both as a primarily and as a secondarily coupled continuously variable power-branched transmission, wherein the power branching can take place both hydraulically and electrically or by a combination of the two.

A transmission output or transmission output shaft 26 of the transmission 3 can be connected by way of a frictional shifting element 27 arranged coaxially with the transmission output shaft 26 for a first driving range of the transmission 3, a loose wheel 28 and a fixed wheel 29, to the second shaft 24 of the hydrostat unit 21. In addition, the transmission output shaft 26 can be coupled by way of a fixed wheel 30, a fixed wheel 31 and a further frictional shifting element 32 for a second driving range of the transmission 3, as well as a loose wheel 33 and a fixed wheel 34, to the second sun gear 17. The fixed wheel 34 is arranged coaxially with the second sun gear 17, whereas the fixed wheel 31, the frictional shifting element 32 for the second driving range and the loose wheel 33 are arranged coaxially with one another. The fixed wheel 30, the frictional shifting element 27 for the first driving range and the loose wheel 28, in turn, are arranged coaxially with the transmission output shaft 26. In addition the fixed wheel 30 meshes both with the fixed wheel 31 and with the fixed wheel 34 of a shaft 35, which in turn can be connected to the driven vehicle axle or with several driven vehicle axles of the drive output 4.

The driving direction clutches 9 and 10 are in this case wet-operating clutches, which are provided not only to produce the force flow between the drive engine 2 and the drive output 4, but at the same time also to determine the driving direction. In accordance with their capacitive design the frictional shifting elements 9 and 10 of the vehicle drive-train 1 according to FIG. 2 can also be used as starting elements. This is the case when, starting from a neutral operating condition of the transmission 3 in which the shifting elements 27 and 32 are open, a driver engages a driving direction and at the same time actuates an accelerator pedal to produce a desired speed. In the present case the frictional shifting elements 9 and 10 are designed in such manner that by means thereof even a driving direction change or a so-termed reversing process starting from higher driving speeds in the forward or reverse direction is possible.

During such a reversing process, starting from the current vehicle speed the vehicle speed is first reduced toward zero, and for this both the transmission capacity of the frictional shifting element 9 and also the transmission capacity of the frictional shifting element 10 are adjusted to the corresponding extent. During the reversing process the two frictional shifting elements 9 and 10 are mainly operated in a slipping mode. When the vehicle's speed is essentially equal to zero, the transmission capacities of the two shifting elements 9 and 10 are adjusted in such manner that the vehicle starts driving in the direction opposite to its previous driving direction until the required driving speed is reached.

To be able to carry out a starting process within short operating times and essentially without delay, beginning from when the vehicle is at rest and the transmission 3 is in its neutral operating condition, the shifting element 27 of the first gear ratio range of the transmission 3 is closed and in addition the shifting element 9 or the shifting element 10 is changed respectively to its closed operating condition depending on the driver's wish for forward or reverse driving at the time. During the engagement of the shifting element 27 and the shifting element 9 or 10, the two hydraulic units 20 and 25 are adjusted by means of an adjustable yoke 36 in such manner that in the area of the transmission 3 the desired starting gear ratio is set. For this, the transmission capacity of the frictional shifting element 9 or 10 is set to values greater than zero during the specification of the starting gear ratio, in order to be able to start a vehicle made with the vehicle drive-train 1 according to FIG. 1 already during a closing process of the frictional shifting element 9 or 10.

Figure 3:
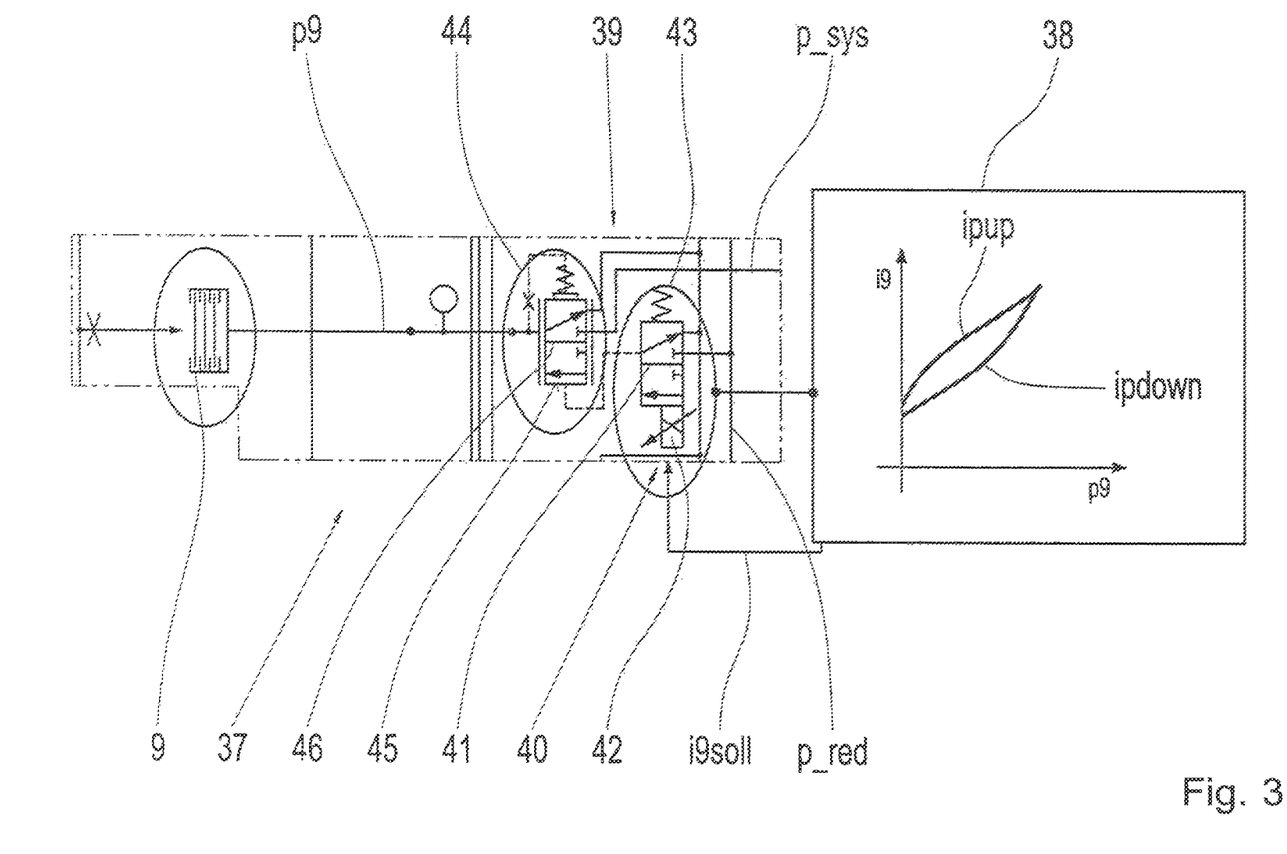
FIG. 3: An actuation chain of one of the shifting elements in the transmission according to FIG. 2.

FIG. 3 shows part of an electro-hydraulic control and regulation device 37 by means of which, among other things, the frictional shifting elements 9 and 10 can be actuated appropriately to produce the functionalities described above. In the present case, to actuate the shifting element 9 in the area of an electric control unit 38 a reference value i9*soll* of the actuating current i9 of the shifting element 9 is emitted and applied in the area of a valve device 39. Thus, in the area of the valve device 39, as a function of the reference value i9*soll* of the actuating current i9 an actuation pressure p9 is produced, which is applied in the area of the shifting element 9, namely in the area of a piston chamber of the shifting element 9.

In this case the valve device 39 comprises a proportional pressure regulator 40, whose valve slide 41 can be displaced by an electromagnet 42 against the spring force of a spring device 43. The electromagnet 42 is actuated as a function of the reference value i9*soll* of the actuating current i9. In the area of the proportional pressure regulator 40 a supply pressure signal p_red or reducing pressure is applied, which, as a function of the reference value i9*soll* of the actuating current i9, can be applied at the level appropriate in each case for actuating the shifting element 9, to a hydraulic amplifier 44 of the valve device 39 in the area of a control surface 45 of a valve slide 46 of the hydraulic amplifier 44. In addition, the hydraulic amplifier 44 is acted upon by a supply pressure signal p_sys which corresponds to a system pressure of a primary pressure circuit of the electro-hydraulic regulation device 37 and which, by virtue of the valve amplification in the area of the hydraulic amplifier 44, in this case increased by a factor of 2.7, can be applied at the shifting element 9 as the actuating pressure p9.

Depending on the application concerned, it can also be provided that the shifting element 9 is actuated directly by the system pressure p_sys, i.e. without the additional hydraulic amplifier, when the pressure is sufficiently high.

Since all the components of the actuation chain or regulating trains of the shifting element 9 and also the shifting element 9 itself, shown in FIG. 3, are characterized by manufacturing or component tolerances and the component tolerances in the area of the electric control unit 38, the proportional pressure regulator 40, the hydraulic amplifier 44, the shifting element 9 and the hydraulic lines that connect the hydraulic components are connected in series and in total have a significant influence on the actuation of the shifting element 9, the procedure described in detail below is carried out in order to be able to actuate the shifting element 9 to the desired extent independently of the tolerance chain.

When a corresponding demand to actuate the shifting element 9 occurs, an actuating pressure p9 that corresponds thereto must be applied in the area of the shifting element 9. For this, with the help of so-termed i-p-characteristic curves ipup and ipdown the respective actuating current i9 that corresponds to the required actuating pressure p9 is selected. Here, the characteristic curve ipup represents the empirically determined actuating current-actuating pressure relationship during an operating condition change of the shifting element 9, starting from a completely drained operating condition in the direction toward a completely closed operating condition of the shifting element 9, whereas the characteristic curve ipdown reproduces the actuating current-actuating pressure relationship during an operating condition change of the shifting element 9, starting from a completely closed operating condition in the direction toward the completely open operating condition of the shifting element 9. The deviation between the characteristic curve ipup and the characteristic curve ipdown is also known as hysteresis, which arises from the different behavior of the actuation chain of the shifting element 9, shown in FIG. 3, in the two above-mentioned actuation directions of the shifting element 9.

To be able to operate the shifting element 9 and also the shifting element 10 of the transmission 3, in this case in the form of a building machine transmission, to the desired extent, the characteristic curves ipup and ipdown stored in the area of the electric control unit 38 have to be adapted to the real behavior of the actuation chain in each case. This adaptation is intended to ensure that the electric control unit 38 emits the reference value i9*soll* required for setting the respective actuating pressure p9, which due to the component tolerances in the area of the actuation chain, deviates to a significant extent from the values stored in the form of the characteristic curves ipup and ipdown.

Figure 4:
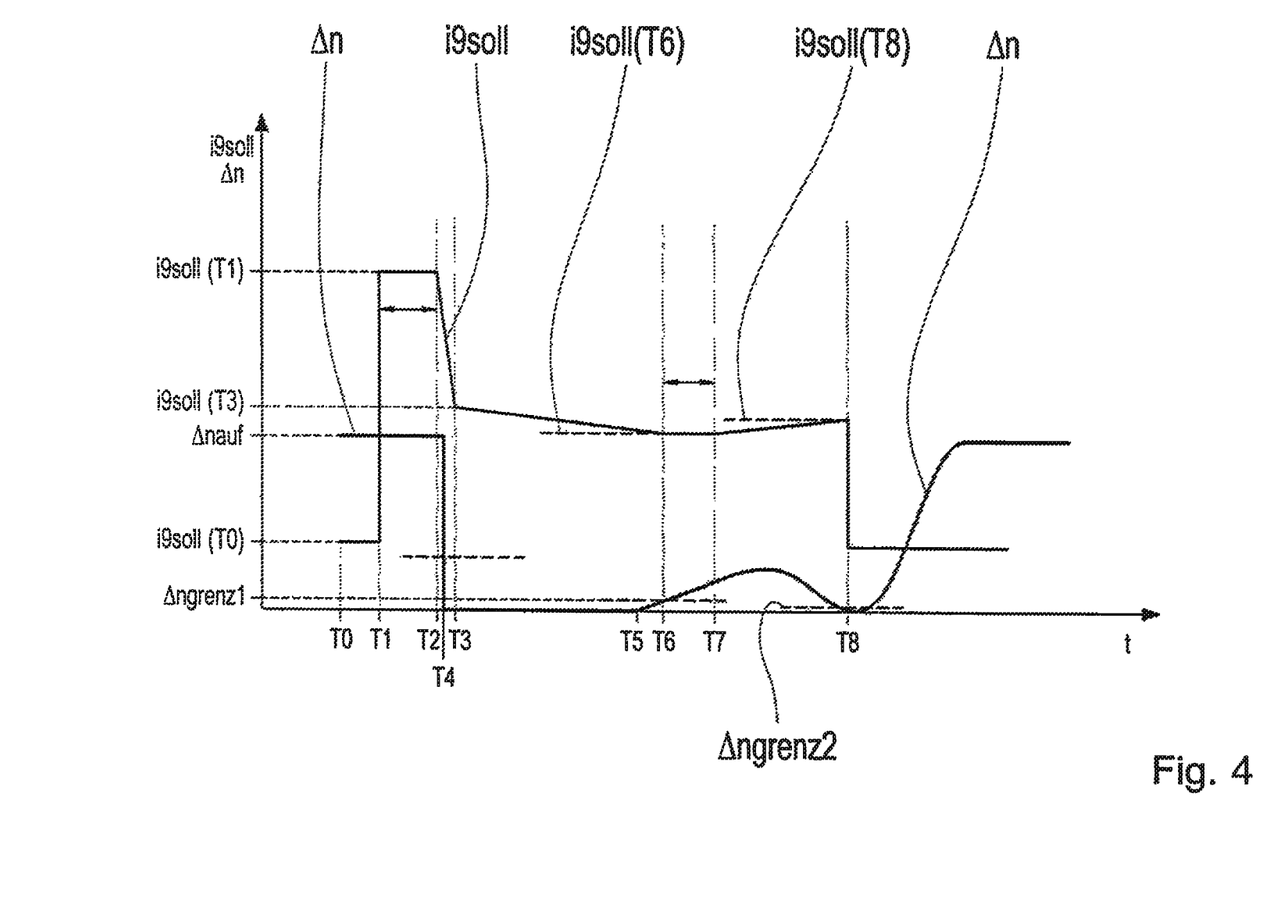
FIG. 4: A number of variations over time t of various operating condition parameters of the transmission according to FIG. 2, which occur while the procedure according to the invention is being carried out.

For this purpose, in the manner shown in detail in FIG. 4, during the calibration process the reference value i9*soll* is varied over the operating time t in order to be able to determine a reference value i9*soll* that corresponds to a defined operating condition of the shifting element 9 or 10. In this context the defined operating point corresponds to an operating condition of the shifting element 9 or 10 in which the transmission capacity of the shifting element 9 or 10 is essentially equal to zero, and starting from which an increase of an actuating force or of the actuating pressure p9 results in an immediate increase of the transmission capacity of the shifting element 9 or 10. At a time T0 the electric control unit 38 emits a reference value i9*soll* (T0) whose level corresponds to a so-termed diagnosis current level, and with which the electric control circuit can be checked automatically with regard to its basic functionality. Thus, for example, it is possible to recognize that a cable has broken or that some other current-circuit-interrupting functional defect exists in the area of the electric control circuit, since in such a case no current flow can be detected. At time T0 the shifting element 9 or the shifting element 10 is in its completely open operating condition, for which reason a rotational speed difference $\Delta n$ between the rotational speeds of the shifting element halves of the shifting element 9 or 10 will have a value $\Delta n_{auf}$.

The shifting element half of the shifting element 9 or the shifting element 10 connected to the transmission input shaft 6 is driven at the rotational speed of the drive engine 2, which during the calibration is higher than a predefined threshold. At the same time the shifting elements 27 and 32 are open, so that a connection between the shifting element half of the shifting element 9 or 10 and the drive output 4, which can be coupled to the drive output 4 by way of the shifting elements 27 and 32, is interrupted and the rotational speed of the shifting element half of the shifting element 9 or 10 that can be coupled to the drive output 4 is essentially equal to zero. At time T1 the reference value i9*soll* of the actuating current i9 is increased abruptly to the value i9*soll* (T1) and kept at that level until a time T2. At time T2 the reference value i9*soll* is reduced along a ramp until a time T3.

The effect of increasing the reference value i9*soll* between times T1 and T2 is that the shifting element 9 or 10 is acted upon by a pressure pulse, which causes the shifting element 9 or 10 to fill and moves the open shifting element 9 or 10 in the direction toward its closed operating condition. At a time T4 between the times T2 and 13 the rotational speed difference Δn falls from the value Δnauf to zero, which means that at time T4 the shifting element 9 or 10 is completely closed. In the present case the rotational speeds of the shifting element halves of the shifting element 9 or 10 are determined by measurement.

The action upon the shifting element 9 or 10 by the pressure pulse between times T1 and T2 corresponds essentially to the actuation of the shifting element 9 or 10 occurring during the operation of the transmission 3, which in that case, in a manner known as such, is filled by a rapid filling pressure during a rapid filling phase and to which, during a subsequent filling equalization phase, a filling equalization pressure is applied. During the filling equalization phase all the components to be actuated, such as a piston and a disk pack of the shifting element 9 or 10 in the present case made in the form of a frictional disk clutch, are in contact with one another and are then in functional connection with one another without gaps, as appropriate for a delay-free actuation of the shifting element 9 or 10.

Since the basic behavior of the shifting element 9 or 10 is known and it can therefore be predicted already at time T2 that at time T4 the shifting element 9 or 10 will reach its completely closed operating condition, the reference value i9*soll* of the actuating current i9 is already at time T2 reduced as described earlier to the level at time T3, so that the method described can be carried out within short operating times. At the reference value i9*soll* (T3) the shifting element 9 or 10 is in any case in its completely closed operating condition, so the rotational speed difference Δn at time T3 is equal to zero as before. Starting from time T3 the reference value i9*soll* of the actuating current i9 is reduced steadily along a ramp with gradient substantially smaller than the gradient of the ramp between times T2 and T3. The result of reducing the reference value i9*soll* is that the rotational speed difference Δn increases again at time T5 and exceeds a predefined limit value Δngrenz1 at time T6.

The limit value Δngrenz1 is an empirically determined limit value at which the shifting element 9 or 10 is at the defined operating point at which the transmission capacity of the shifting element 9 or 10 is again essentially equal to zero, and from which an increase of the actuating pressure P9 results in an immediate increase of the transmission capacity of the shifting element 9 or 10. After time T6 the reference value i9*soll* (T6) is kept essentially constant until a time T7 later than T6. Since the drive rotational speed of the drive engine 2 is set to be constant and the rotational speed of the shifting element half of the shifting element 9 or 10 that can be coupled to the drive output 4 is no longer driven by the drive engine 2, the rotational speed of the shifting element half of the shifting element 9 or 10 that can be coupled to the drive output 4 falls in the direction toward zero, which brings about an increase of the rotational speed difference Δn.

The reference value i9*soll* (T6) determined at time T6 is stored in the electric control unit as the value to be emitted in order to set the filling equalization pressure or actuating pressure p9 as the reference value i9*soll*, in order to bring the shifting element 9 or 10 to the defined operating point.

In addition, the reference value i9*soll* (T6) is used to adapt the characteristic curve ipdown. Since the actuating pressure p9 of the shifting element 9 or 10 at which the shifting element 9 or 10 is at the defined operating point is determined empirically and is therefore known, first the reference value i9*soll* that corresponds to this actuating pressure p9 is determined from the characteristic curve and compared with the reference value i9*soll* (T6). Depending on the deviation determined from that, the entire characteristic curve ipdown is displaced upward or downward along the ordinate by the positive or negative deviation found, and used for the subsequent actuation of the shifting element 9 or 10 during the operation of the transmission 3.

At a time T7 later than the time T6, which at the same time represents the end of a waiting period and at which it can be safely assumed that the shifting element 9 or 10 is in its completely open condition, the reference value i9*soll* of the actuating current i9 is again increased along a ramp. During the waiting period between times T6 and T7 the rotational speed difference Δn is always larger than a minimum threshold, which is in turn larger than the limit value Δngrenz1. The increase of the reference value i9*soll* causes the shifting element 9 or 10 to be acted upon by increasing actuating pressure and the transmission capacity of the shifting element 9 or 10 increases. In addition, the increase of the transmission capacity of the shifting element 9 or 10 has the result that the rotational speed difference Δn falls again after time T7, to a value lower than a further limit value Δngrenz2 at a time T8. At time T8 the defined operating point of the shifting element 9 or 10 is recognized and the reference value i9*soll* (T8) existing at time T8 is stored in the electric control unit 38 as the reference value i9*soll* (T8) that corresponds to the defined operating point of the shifting element 9 or 10, and used for adapting the characteristic curve ipup. For that, with the help of the reference value i9*soll* (T8) determined at time T8, the characteristic curve ipup is adapted to the real behavior of the actuation chain in the same way as the characteristic curve ipdown, and used in the subsequent operation of the transmission 3. The reference values determined in each case are stored in a non-volatile memory, i.e. an EPROM or an EEPROM of the electric control unit 38.

In addition, as shown in FIG. 4, at time T8 the reference value i9*soll* is reduced to the diagnosis value at T0, and this brings to an end the process of determining the reference value of the actuating current i9 that corresponds to the defined operating point. Owing to the reduction of the reference value i9*soll* of the actuating current i9 the actuating pressure p9 of the shifting element 9 or 10 decreases and the shifting element 9 or 10 is completely drained. At the same time the rotational speed difference Δn increases after time T8 to the initial level Δnauf.

The procedure described above provides in a simple manner the possibility, during the determination of the filling equalization pressure of the shifting element 9 or 10, of taking into account the complete regulation train or actuation chain and its component tolerances. To be specific, by virtue of the procedure it is determined with which reference value specification or current output of the electric control unit 38, in the area of the shifting element 9 or 10 an actuating pressure p9 of such size is applied that a previously open clutch will be closed or a previously closed clutch will be opened. During this a recognition function monitors the primary-side and secondary-side rotational speeds of the shifting element 9 or 10. If the amount of the rotational speed difference exceeds the threshold value Δngrenz1 or if the rotational speed difference falls below the threshold value Δngrenz2, the current is no longer sufficient to keep the shifting element 9 or 10 closed, or indeed sufficient to close it, whereby the so-termed slipping current of the shifting element 9 or 10 is found.

By virtue of the method, for both arms of the hysteresis curve that comprises the characteristic curves ipup and ipdown the offset values can be determined, such that these offset values can be taken into account directly in the control and regulation unit of the shifting element 9 or 10. Alternatively, in the manner described earlier there exists the possibility, of appropriately adapting the relationship between the actuating current i9 and the actuating pressure p9 determined empirically from the characteristic curves ipup and ipdown by means of the reference values i9*soll* (T6) and i9*soll* (T8), and using them for the further actuation of the shifting element 9 or 10.

INDEXES

1 Vehicle drive-train
2 Drive engine
3 Transmission
4 Drive output
5 Auxiliary power takeoff
6 Transmission input shaft
7 Fixed wheel
8 Further auxiliary power takeoff
8A Fixed wheel
9 Frictional shifting element
10 Frictional shifting element
11 Loose wheel
12 Loose wheel
13 Planetary carrier
14 Loose wheel
15 Double planetary carrier
16 First sun gear
17 Second sun gear
18 Ring gear
19 Shaft
20 First hydraulic unit
21 Hydrostat unit
22 Fixed wheel
23 Fixed wheel
24 Shaft
25 Second hydraulic unit
26 Transmission output shaft
27 Frictional shifting element
28 Loose wheel
29 Fixed wheel
30 Fixed wheel
31 Fixed wheel
32 Frictional shifting element
33 Loose wheel
34 Fixed wheel
35 Shaft
36 Adjustable yoke
37 Electro-hydraulic control and regulation unit
38 Electric control unit
39 Valve device
40 Proportional pressure regulator
41 Valve slide of the proportional pressure regulator
42 Electromagnet
43 Spring device
44 Hydraulic amplifier
45 Control surface
46 Valve slide
Δn Rotational speed difference
Δnauf Discrete value of the rotational speed difference, opening level
Δngrenz1 Predefined limit value of the rotational speed difference
Δngrenz2 Further defined limit value of the rotational speed difference
i9 Actuating current
i9*soll* Reference value of the actuating current
ipdown Characteristic curve
ipup Characteristic curve
p9 Actuating pressure
p_red Supply pressure signal
p_sys Supply pressure signal, system pressure
T0-T8 Discrete time point
t Time

The invention claimed is:

1. A method of determining a reference value (i9*soll* (T6), i9*soll* (T8)) of an actuating current (i9) of an electro-hydraulically actuated frictional shifting element (9, 10) of a continuously variable power-branched transmission (3), the method comprising:

defining an operating point of the electro-hydraulically actuated shifting element, at which a transmission capacity of the electro-hydraulically actuated shifting element (9, 10) is substantially equal to zero;

increasing an actuating force resulting in an immediate increase of the transmission capacity of the electro-hydraulically actuated shifting element, wherein a first shifting element half of the electro-hydraulically actuated shifting element is connected to a transmission input (6) and a second shifting element half of the electro-hydraulically actuated shifting element (9, 10) is coupled to a transmission output (4);

decoupling the second shifting element half from the transmission output; and reducing the reference value (i9*soll*) of the actuating current (i9) of the shifting element (9, 10) in a substantially closed operating condition, until a rotational speed difference (Δn), between rotational speeds of the first shifting element half of the electro-hydraulically actuated shifting element and the second shifting element half of the electro-hydraulically actuated shifting element, exceeds a first predefined limit value (Δngrenz1), such that the reference value (i9*soll* (T6)) of the actuating current (i9), at a time-point (T6) when the first predefined limit value (Δngrenz1) is exceeded, is the reference value (i9*soll* (T6)) of the actuating current (i9) that corresponds to the defined operating point of the shifting element (9, 10) used to adapt a first curve (ipdown) used for subsequent actuation of the shifting element (9, 10) during operation of the transmission (3).

2. The method according to claim 1, further comprising setting a reference value of a hydraulic actuating pressure (p9) of the shifting element (9, 10), in an area of a valve device (39), as a function of the reference value (i9*soll*) of the actuating current (i9) and which is applied in an area of a piston chamber of the shifting element (9, 10).

3. The method according to claim 2, further comprising initially changing the shifting element (9, 10) from an open operating condition, in which the piston chamber is substantially, completely drained, to the closed operating condition, by acting upon the reference value (i9*soll*) of the actuating current (i9) and, as a result, applying a pressure pulse in the area of the piston chamber at a defined pressure level of the actuating pressure and for a defined operating time.

4. The method according to claim 3, further comprising before reaching the closed operating condition of the shifting element (9, 10), in which the rotational speed difference ($\Delta$n), between rotational speeds of the first shifting element half of the electro-hydraulically actuated shifting element and the second shifting element half of the electro-hydraulically actuated shifting element, is substantially equal to zero,
reducing the reference value (i9*soll*) of the actuating current (i9) along a ramp from a first level (i9*soll* (T1)) of the pressure pulse in a direction toward a second level (i9*soll* (T3)) at which the shifting element (9, 10) is still in the closed operating condition; and
reducing the reference value (i9*soll*), of the actuating current (i9), along a ramp until the rotational speed difference ($\Delta$n), between rotational speeds of the first shifting element half of the electro-hydraulically actuated shifting element and the second shifting element half of the electro-hydraulically actuated shifting element, exceeds the first predefined limit value ($\Delta$ngrenz1).

5. The method according to claim 1, further comprising, from the time-point (T6) at which the rotational speed difference ($\Delta$n), between rotational speeds of the first shifting element half of the electro-hydraulically actuated shifting element and the second shifting element half of the electro-hydraulically actuated shifting element, exceeds the first predefined limit value ($\Delta$ngrenz1),
setting the reference value (i9*soll*) of the actuating current (i9) for a predefined time period to a level at which the rotational speed difference ($\Delta$n), between rotational speeds of the first shifting element half of the electro-hydraulically actuated shifting element and the second shifting element half of the electro-hydraulically actuated shifting element, is larger than an additional limit value, which is larger than the first predefined limit value ($\Delta$ngrenz1).

6. The method according to claim 5, further comprising, after lapse of the predefined time period,
increasing the reference value (i9*soll*) of the actuating current (i9) along a ramp until the rotational speed difference ($\Delta$n), between rotational speeds of the first shifting element half of the electro-hydraulically actuated shifting element and the second shifting element half of the electro-hydraulically actuated shifting element, falls below a second predefined limit value ($\Delta$ngrenz2) such that the reference value (i9*soll* (T8)) corresponds to the defined operating point of the shifting element (9, 10) used to adapt a second curve (ipup) used for subsequent actuation of the shifting element (9, 10) during operation of the transmission (3).

7. The method according to claim 1, further comprising, after determining the reference value (i9*soll* (T8)) of the actuating current (i9) that corresponds to the defined operating point of the shifting element (9, 10), reducing the reference value (i9*soll*) of the actuating current (i9) to a level (i9*soll* (T0)) at which the shifting element (9, 10) changes to a completely open operating condition.

8. The method according to claim 1, further comprising determining the rotational speeds of the first shifting element half of the electro-hydraulically actuated shifting element and the second shifting element half of the electro-hydraulically actuated shifting element by measurement.

9. The method according to claim 6, further comprising empirically determining the first and second predefined limit values ($\Delta$ngrenz1, $\Delta$ngrenz2).

10. The method according to claim 6, further comprising actuating the shifting element with reference to a relationship between reference values of the actuating current, reference values of actuating pressure and a characteristic diagram that shows an operating temperature of the transmission.

11. The method according to claim 10, further comprising actuating the shifting element (9, 10) with reference to the first and second curves (ipup, ipdown) that diagram a relationship between reference values (i9*soll*) of the actuating current (i9) and reference values of actuating pressure (p9), which are determined empirically.

12. The method according to claim 11, further comprising adapting either the characteristic diagram or the first and second curves (ipup, ipdown) as a function of a deviation between the reference value (i9*soll*) of the actuating current (i9) corresponding to the defined operating point of the shifting element (9, 10), and the reference value (i9*soll*) of the actuating current (i9) obtainable for the defined operating point of the shifting element from either the characteristic diagram or the first and second curves.

* * * * *